Figure 1:
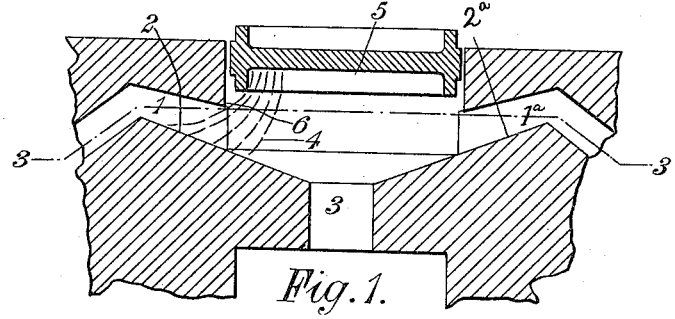

V. H. GREGORY.
FURNACE FOR DRAWING GLASS.
APPLICATION FILED MAR. 14, 1911.

1,157,980.

Patented Oct. 26, 1915.
2 SHEETS—SHEET 1.

V. H. GREGORY.
FURNACE FOR DRAWING GLASS.
APPLICATION FILED MAR. 14, 1911.
1,157,980.
Patented Oct. 26, 1915.
2 SHEETS—SHEET 2.
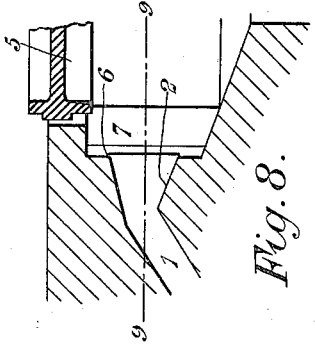
Fig. 8.
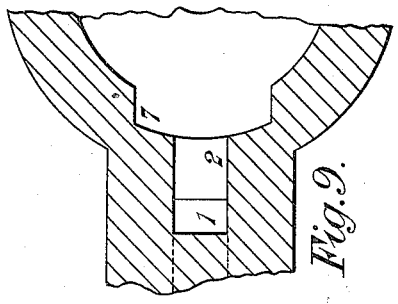
Fig. 9.
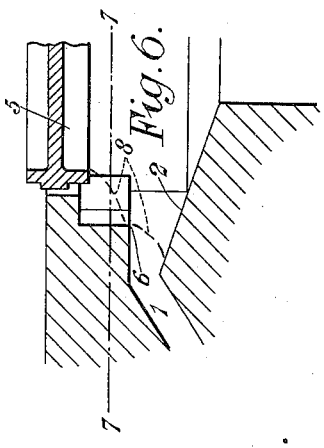
Fig. 6.
Fig. 4.
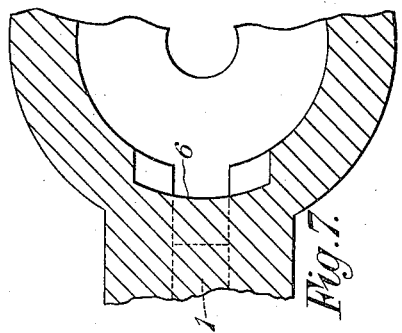
Fig. 7.
Fig. 5.
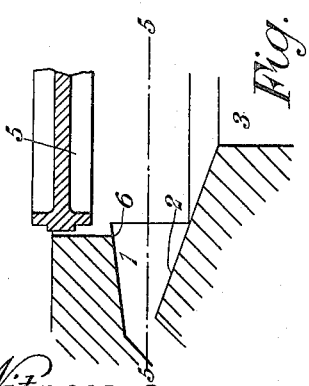
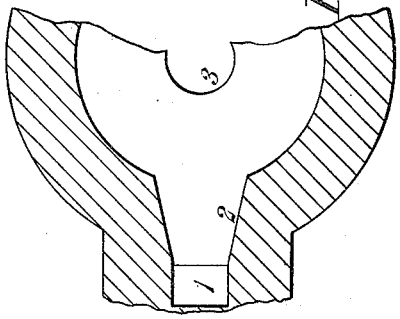
Witnesses
Inventor
V. H. Gregory
per Rogers, Kennedy, Campbell
Attorneys.

UNITED STATES PATENT OFFICE.

VICTOR HERBERT GREGORY, OF CHISWICK, ENGLAND, ASSIGNOR TO PILKINGTON BROTHERS, LIMITED, OF ST. HELENS, ENGLAND.

FURNACE FOR DRAWING GLASS.

1,157,980. Specification of Letters Patent. Patented Oct. 26, 1915.

Application filed March 14, 1911. Serial No. 614,410.

*To all whom it may concern:*

Be it known that I, VICTOR HERBERT GREGORY, a subject of the King of the United Kingdom of Great Britain and Ireland, and residing at 59 Park road, Chiswick, Middlesex, England, have invented new and useful Improvements in Furnaces for Drawing Glass, of which the following is a specification.

This invention relates to furnaces for heating reversible pots from which glass is drawn.

When the pot is reversed to allow the glass which has remained in it after the drawing operation, to drain out into the furnace, the glass falls from the underside of the pot in threads and it is found that these threads of glass are carried with the out-going gases from the furnace, into the passage by which the gases issue from the furnace, and accumulate in such passage and eventually block it up.

This invention has for its object to prevent the threads of glass blocking up the passage by which the gases issue from the furnace.

In carrying out this invention, the passage, by which the gases issue from the furnace, is provided with a floor sloping downward into the furnace, and is so shaped that the threads of glass come in contact with the sloping floor. By these means, any accumulation of glass formed on this floor, runs back into the furnace, and through the hole provided as ordinarily, for draining off the glass.

Figure 2:
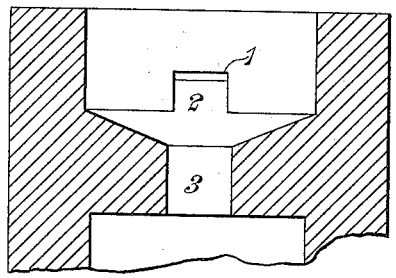
Figure 3:
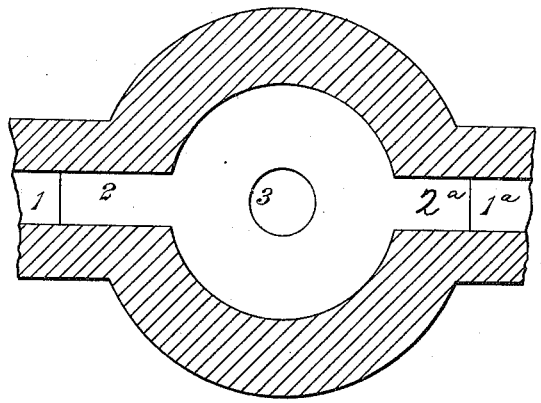

In the accompanying drawings:—Figures 1 and 2 are vertical sections taken respectively at right angles to each other, through the upper part of one construction of furnace according to this invention; Fig. 3 is a horizontal section on the crooked line 3—3 of Fig. 1; Figs. 4 and 5 are respectively a vertical and a horizontal section, the latter on the line 5—5 of the former, of part of a modified construction of the furnace; Figs. 6 and 7 are views respectively similar to Figs. 4 and 5 of another modified construction of the furnace, Fig. 7 being a horizontal section on the line 7—7 of Fig. 6; and Figs. 8 and 9 are views respectively similar to Figs. 4 and 5 of a still further modified construction of the furnace, Fig. 9 being a horizontal section on the line 9—9 of Fig. 8.

Referring to Figs. 1, 2 and 3, 1 is the passage by which the gases issue from the furnace, $1^a$ the passage by which they enter the furnace, 3 is a hole at the bottom of the furnace through which the glass descending from the pot, falls. This hole 3 leads into a water-sealed chamber, so that there is no outlet or inlet through it for gases or air. The passage 1 is made with a floor 2 which slopes downward toward the hole 3 provided for draining off the glass. The threads of glass 4 (shown in dotted lines in Fig. 1) descending from the underside of the pot 5, are drawn into the passage 1 and come into contact with the floor 2, but owing to the slope of this floor, they cannot be carried up it farther into the passage, but run back into the hole 3. The passage $1^a$ is also preferably given a sloping floor $2^a$ so that the functions of the passages 1 and $1^a$ may be reversed.

It has been found that there is less tendency for the threads of glass to be drawn into the passage by which the gases issue from the furnace, if the velocity of the gases, as they enter the passage, be reduced by widening the mouth of the passage. The mouth of the passage may be widened in many different ways of which some are shown in the drawings. Thus Figs. 4 and 5 show the mouth widened by flaring the upper part of the passage upward and the sides outward. Or, as shown in Figs. 6 and 7, the upper part only may be widened and a step made in it; or a recess 7, Figs. 8 and 9, having also a sloping floor, may be formed in the wall of the furnace, and the passage 1, with any suitable form of mouth, may be taken from the back of this recess.

The length of the sloping floor necessary to prevent any threads of glass reaching the part of the passage that slopes downward away from the furnace, depends on the velocity of the gases and also on the position of the edge 6 of the upper part of the passage. This edge, if suitably located, serves to catch the threads of glass which might otherwise be drawn into the passage beyond the downward slope 2, and insures their coming into contact with the said slope. This action of the edge is illustrated in Fig. 6 where the dotted line 8 represents a thread of glass caught by the edge 6.

I claim:—

1. A furnace for heating reversible pots from which glass is drawn and from which glass only has egress through a central hole in the furnace floor which slopes toward the said central hole, the wall of said furnace having a passage by which the gases issue from the furnace, said passage having a floor sloping downward toward the sloping floor of the furnace.

2. A furnace for heating reversible pots from which glass is drawn and from which glass only has egress through a central hole in the furnace floor which slopes toward the said central hole, the wall of said furnace having a recess and a passage opening into that recess by which the gases issue from the furnace, said passage having a floor sloping downward toward the sloping floor of the furnace.

3. In a furnace for heating reversible pots from which glass is drawn, the wall of which has a passage by which the gases issue from the furnace, the combination of a floor sloping downward into the furnace for returning to the latter any glass descending from the pot, and an edge formed by the junction of the passage with the furnace below the level of the bottom edge of the pot, with which edge threads of glass from the pot contact before touching the sloping floor.

In witness whereof I have hereunto set my hand in the presence of two witnesses.

VICTOR HERBERT GREGORY.

Witnesses:
FRANCIS ALBERT CLEMO,
THOMAS JAMES BLAKER.

Copies of this patent may be obtained for five cents each, by addressing the "Commissioner of Patents, Washington, D. C."